US008705092B2

(12) United States Patent  
Goel et al.

(10) Patent No.: US 8,705,092 B2
(45) Date of Patent: Apr. 22, 2014

(54) METHOD AND SYSTEM FOR REPURPOSING E-MAIL CORRESPONDENCE TO SAVE PAPER AND INK

(75) Inventors: Naveen Goel, Uttar Pradesh (IN); Mayur Hemani, New Delhi (IN); Hemant Virmani, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 363 days.

(21) Appl. No.: 12/849,306

(22) Filed: Aug. 3, 2010

(65) Prior Publication Data

US 2013/0128301 A1    May 23, 2013

(51) Int. Cl.
G06F 3/12    (2006.01)

(52) U.S. Cl.
USPC .......................... 358/1.15; 709/206; 709/207

(58) Field of Classification Search
USPC ................................. 709/207, 206; 358/1.15
See application file for complete search history.

(56) References Cited

U.S. PATENT DOCUMENTS

| 6,128,655 | A | 10/2000 | Fields et al. |
| 6,266,684 | B1 | 7/2001 | Kraus et al. |
| 7,206,784 | B2 | 4/2007 | Gu et al. |
| 7,231,593 | B1 | 6/2007 | Raja et al. |
| 7,237,188 | B1 | 6/2007 | Leung |
| 7,366,981 | B2 | 4/2008 | Wu et al. |
| 7,599,094 | B2 | 10/2009 | Sellers et al. |
| 7,680,858 | B2 | 3/2010 | Poola et al. |
| 7,882,427 | B2 | 2/2011 | Raja et al. |
| 7,907,151 | B2 | 3/2011 | Daviss |
| 8,024,412 | B2 * | 9/2011 | McCann et al. ............... 709/206 |
| 8,085,421 | B2 | 12/2011 | Hamilton, II et al. |
| 8,305,653 | B2 | 11/2012 | Austin et al. |
| 8,397,155 | B1 | 3/2013 | Szabo |
| 8,407,579 | B2 | 3/2013 | Raja et al. |
| 8,451,489 | B1 | 5/2013 | Arora |
| 8,467,082 | B1 | 6/2013 | Miller et al. |
| 2002/0135800 | A1 | 9/2002 | Dutta |
| 2003/0110227 | A1 * | 6/2003 | O'Hagan ...................... 709/206 |
| 2003/0163537 | A1 * | 8/2003 | Rohall et al. .................. 709/206 |
| 2004/0017577 | A1 | 1/2004 | Ostrover et al. |
| 2004/0019699 | A1 | 1/2004 | Dam et al. |

(Continued)

OTHER PUBLICATIONS

"Final Office Action", U.S. Appl. No. 12/849,231, (Oct. 24, 2012), 11 pages.

(Continued)

Primary Examiner — Benny Q Tieu
Assistant Examiner — Quyen V Ngo
(74) Attorney, Agent, or Firm — Wolfe-SBMC

(57) ABSTRACT

E-mail correspondence is repurposed to save paper and ink. An indication that a printout of e-mail correspondence from a printer has been requested is received. Further, a plurality of e-mail messages that belong to an e-mail conversation tree is detected. In addition, the plurality of e-mail messages in the e-mail conversation tree is reordered according to a respective timestamp associated with each e-mail message in the plurality of e-mail messages. The respective timestamp indicates a time of transmission. A root e-mail message is determined according to an earliest respective timestamp. The root e-mail message is a root node of the e-mail conversation tree. Further, a plurality of content blocks from the root e-mail message is recorded as a set of print blocks. In addition, a plurality of subsequent e-mail message content blocks with the set of print blocks.

18 Claims, 15 Drawing Sheets

(56) References Cited

U.S. PATENT DOCUMENTS

| | | | |
|---|---|---|---|
| 2004/0044735 A1* | 3/2004 | Hoblit | 709/206 |
| 2004/0049730 A1 | 3/2004 | Ishizaka | |
| 2004/0068698 A1 | 4/2004 | Wu et al. | |
| 2004/0205607 A1 | 10/2004 | Kim et al. | |
| 2005/0004990 A1* | 1/2005 | Durazo et al. | 709/206 |
| 2005/0231758 A1 | 10/2005 | Reynolds | |
| 2006/0015804 A1 | 1/2006 | Barton et al. | |
| 2006/0167976 A1* | 7/2006 | Brown et al. | 709/203 |
| 2007/0127064 A1 | 6/2007 | Kuroshima | |
| 2007/0273895 A1 | 11/2007 | Cudd et al. | |
| 2008/0086695 A1* | 4/2008 | Oral | 715/752 |
| 2008/0137132 A1 | 6/2008 | Perronnin | |
| 2008/0159768 A1 | 7/2008 | Katoh et al. | |
| 2008/0288860 A1 | 11/2008 | Daviss | |
| 2009/0063245 A1 | 3/2009 | Anderson | |
| 2009/0100374 A1 | 4/2009 | Sheasby et al. | |
| 2009/0119272 A1* | 5/2009 | Sastry | 707/3 |
| 2009/0249193 A1 | 10/2009 | Hanechak | |
| 2010/0027051 A1 | 2/2010 | Hamilton, II et al. | |
| 2010/0123908 A1 | 5/2010 | Denoue et al. | |
| 2010/0188681 A1 | 7/2010 | Kawano | |
| 2010/0214614 A1 | 8/2010 | Ferlitsch et al. | |
| 2010/0235456 A1* | 9/2010 | Uchiyama et al. | 709/206 |
| 2010/0281351 A1 | 11/2010 | Mohammed | |
| 2011/0032562 A1 | 2/2011 | McCuen et al. | |
| 2011/0043831 A1 | 2/2011 | Sprague et al. | |
| 2011/0145085 A1 | 6/2011 | Khachatrian et al. | |
| 2011/0235064 A1 | 9/2011 | Arai | |
| 2011/0273739 A1 | 11/2011 | Grasso et al. | |
| 2012/0033237 A1 | 2/2012 | Arora et al. | |
| 2013/0128314 A1 | 5/2013 | Chopra et al. | |
| 2013/0128315 A1 | 5/2013 | Arora et al. | |
| 2013/0132812 A1 | 5/2013 | Goel et al. | |
| 2013/0132817 A1 | 5/2013 | Sharad et al. | |

OTHER PUBLICATIONS

"Final Office Action", U.S. Appl. No. 12/849,349, (Oct. 24, 2012), 14 pages.

"Final Office Action", U.S. Appl. No. 12/849,475, (Aug. 20, 2012), 14 pages.

"Invent Wheel: Print What You Like Online Printing", retrieved from <http://www.inventwheel.com/web/articleDetailsByVersion.action?versionId=8> on Jan. 8, 2012, 3 pages.

"Non-Final Office Action", U.S. Appl. No. 12/849,231, (May 21, 2012), 12 pages.

"Non-Final Office Action", U.S. Appl. No. 12/849,349, (May 21, 2012), 14 pages.

"Non-Final Office Action", U.S. Appl. No. 12/849,417, (Dec. 5, 2012), 12 pages.

"Non-Final Office Action", U.S. Appl. No. 12/849,475, (Jan. 19, 2012), 12 pages.

"PrintWhatYouLike.com", retrieved from <http://www.printwhatyoulike.com/> on Aug. 2, 2010, 2 pages.

Frye, Curtis D., "Excel Annoyances: Print Layout Annoyances" retrieved from <academic.safaribooksonline.com/print?xmlid=0596007280/excelannoyances-CHP-7-SECT-2>, on May 14, 2012, 18 pages.

Henry, Alan "Print Friendly for Chrome Lets You Easily Remove Unwanted Web Page Elements Before Printing", retrieved from <hhtp://lifehacker.com5865826/print-friendly-for-chrome-lets-you-eaily-remove-unwanted-web-page-elements-before-printing>on Jan. 8, 2012, (Dec. 7, 2011), 3 pages.

Remick, Jarel "Printing Pages with Print What You Like ", retrieved from <http://web.appstorm.net/how-to/printing-pages-with-print-what-you-like/> on Jan. 8, 2012, 14 pages.

"Non-Final Office Action", U.S. Appl. No. 12/849,231, (Mar. 18, 2013),14 pages.

"Non-Final Office Action", U.S. Appl. No. 12/849,349, (Mar. 18, 2013), 15 pages.

"Non-Final Office Action", U.S. Appl. No. 12/849,519, (Mar. 1, 2013), 5 pages.

"Notice of Allowance", U.S. Appl. No. 12/849,519, (Apr. 15, 2013), 7 pages.

"Final Office Action", U.S. Appl. No. 12/849,231, (Sep. 26, 2013), 17 pages.

"Final Office Action", U.S. Appl. No. 12/849,349, (Aug. 19, 2013), 16 pages.

"Final Office Action", U.S. Appl. No. 12/849,417, (Sep. 4, 2013), 13 pages.

"Final Office Action", U.S. Appl. No. 12/849,475, Dec. 24, 2013, 12 pages.

"Notice of Allowance", U.S. Appl. No. 12/846,417, Jan. 7, 2014, 8 pages.

\* cited by examiner

540

Hi,
But this one is not random text. Atleast it does not look so..
Ok some part of it is random..
On second thoughts, I guess most part of it random..
Or may be all of it is random I
Harsh (6) From: Mayur Hemani    Reply To: (5)    Sent: Thursday, April 22, 2010 12:18 PM Hi Harsh,
These galleries to insert tables, headers, footers, lists, cover pages, and other document building blocks. When you create pictures, charts, or diagrams, they also coordinate with your current document look. You can easily change the formatting of selected text in the document text by choosing a look for the selected text from the Quick Styles gallery on the Home tab. You can also format text directly by using the other controls on the Home tab. Most controls offer a choice of using the look from the current theme or using a format that you specify directly. To change the overall look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template. On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting of selected text in the document text by choosing a look for the selected text from the Quick Styles gallery on the Home tab. You can also format text directly by using the other controls on the Home tab. Most controls offer a choice of using the look from the current theme or using a format that you specify directly. To change the overall look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template. On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting of selected text in the document text by choosing a look for the selected text from the Quick Styles gallery on the Home tab. You can also format text directly by using the other controls on the Home tab. Most controls offer a choice of using the look from the current theme or using a format that you specify directly. To change the overall look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template. On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting of selected text from the Quick Styles gallery on the Home tab. You can also format text directly by using the other controls on the Home tab. Most controls offer a choice of using the look from the current theme or using a format that you specify directly. To change the overall look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template. On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting offer a choice of using the look from the current theme or using a format that you specify directly. To change the overall look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template. On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting of selected text in the document text by choosing a look for the selected text from the Quick Styles gallery on the Home tab. You can also format text directly by using the other controls on the Home tab. Most controls offer a choice of using the look from the current theme or using a format that you specify directly. To change the overall

look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template. On the Insert tab, the galleries include items that are designed to coordinate with the overall look of your document.
Thanks,
Mayur (7) From: Neha Rastogi  Reply To: (6)  Sent: Thursday, April 22, 2010 12:19 PM On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting of selected text in the document text by choosing a look for the selected text from the Quick Styles gallery on the Home tab. You can also format text directly by using the other controls on the Home tab. Most controls offer a choice of using the look from the current theme or using a format that you specify directly. To change the overall look of your document, choose new Theme elements on the Page Layout tab. To change the looks available in the Quick Style gallery, use the Change Current Quick Style Set command. Both the Themes gallery and the Quick Styles gallery provide reset commands so that you can always restore the look of your document to the original contained in your current template.
Regards,
Neha (8) From: Neha Rastogi  Reply To: (5)  Sent: Thursday, April 22, 2010 12:20 PM The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog. The quick brown fox jumps over the lazy dog.
Regards,
Neha

*Figure 5J*

METHOD AND SYSTEM FOR REPURPOSING E-MAIL CORRESPONDENCE TO SAVE PAPER AND INK

BACKGROUND

1. Field

This disclosure generally relates to printing. More particularly, the disclosure relates to the reduction of paper and/or ink utilized for printing.

2. General Background

Recent attempts have been made to make technology more environmentally friendly. The resulting technologies are typically called green technologies. For example, green technologies have been developed for computers, automobiles, household appliances, etc.

With respect to computing technologies, a significant environmental concern stems from the printing of paper. Computer users may use compute printers to print large quantities of various types of e-mail correspondences, which typically leads to the use of large amounts of paper. A large demand for paper may lead to the destruction of large quantities of trees, which may have a negative impact on the environment.

As a result, computer users are typically encouraged to reduce the amount of paper utilized for printing by scaling multiple pages down to fit on a single page. A problem with this approach is that the readability and aesthetics of the page are severely hampered. A user may have such a difficult time reading text that has been miniaturized so that two or more pages may fit on one side of a sheet of paper (the other side may also have two or more pages) that the user may simply choose not to utilize green printing and may print in the typical manner, which would not be environmentally friendly.

SUMMARY

In one aspect of the disclosure, a computer program product is provided. The computer program product includes a computer useable medium having a computer readable program. The computer readable program when executed on a computer causes the computer to receive an indication that a printout of e-mail correspondence from a printer has been requested. The e-mail correspondence has content with a format that would result in a first quantity of pages being printed. Further, the computer readable program when executed on the computer causes the computer to detect a plurality of e-mail messages that belong to an e-mail conversation tree. In addition, the computer readable program when executed on the computer causes the computer to reorder the plurality of e-mail messages in the e-mail conversation tree according to a respective timestamp associated with each e-mail message in the plurality of e-mail messages. The respective timestamp indicates a time of transmission. The computer readable program when executed on the computer causes the computer to determine a root e-mail message according to an earliest respective timestamp, the root e-mail message being a root node of the e-mail conversation tree. Further, the computer readable program when executed on the computer causes the computer to record a plurality of content blocks from the root e-mail message as a set of print blocks. In addition, the computer readable program when executed on the computer causes the computer to compare a plurality of subsequent e-mail message content blocks with the set of print blocks. The computer readable program when executed on the computer causes the computer to record, into the set of print blocks, one or more content blocks from the plurality of subsequent e-mail message content blocks that are not already in the set of print blocks. In addition, the computer readable program when executed on the computer causes the computer to generate green e-mail correspondence based on the print blocks such that the green e-mail correspondence has a second quantity of pages that is less than the first quantity of pages.

In another aspect of the disclosure, a process is provided. The process receives an indication that a printout of e-mail correspondence from a printer has been requested. The e-mail correspondence has content with a format that would result in a first quantity of pages being printed. Further, the process detects a plurality of e-mail messages that belong to an e-mail conversation tree. In addition, the process reorders, with the processor, the plurality of e-mail messages in the e-mail conversation tree according to a respective timestamp associated with each e-mail message in the plurality of e-mail messages. The respective timestamp indicates a time of transmission. The process also determines, with the processor, a root e-mail message according to an earliest respective timestamp. The root e-mail message is a root node of the e-mail conversation tree. Further, the process records a plurality of content blocks from the root e-mail message as a set of print blocks. In addition, the process compares, with the processor, a plurality of subsequent e-mail message content blocks with the set of print blocks. The process also records, into the set of print blocks, one or more content blocks from the plurality of subsequent e-mail message content blocks that are not already in the set of print blocks. In addition, the process generates, with the processor, green e-mail correspondence based on the print blocks such that the green e-mail correspondence has a second quantity of pages that is less than the first quantity of pages.

In yet another aspect of the disclosure, a system is provided. The system includes a green print module that receives an indication that a printout of e-mail correspondence from a printer has been requested, the e-mail correspondence having content with a format that would result in a first quantity of pages being printed. Further, the system includes a processor that (i) detects a plurality of e-mail messages that belong to an e-mail conversation tree, (ii) reorders the plurality of e-mail messages in the e-mail conversation tree according to a respective timestamp associated with each e-mail message in the plurality of e-mail messages, (iii) determines a root e-mail message according to an earliest respective timestamp, (iv) records a plurality of content blocks from the root e-mail message as a set of print blocks, (v) compares a plurality of subsequent e-mail message content blocks with the set of print blocks, (vi) records, into the set of print blocks, one or more content blocks from the plurality of subsequent e-mail message content blocks that are not already in the set of print blocks, and (vii) generates green e-mail correspondence based on the print blocks such that the green e-mail correspondence has a second quantity of pages that is less than the first quantity of pages. The respective timestamp indicates a time of transmission. The root e-mail message is a root node of the e-mail conversation tree.

DRAWINGS

The above-mentioned features of the present disclosure will become more apparent with reference to the following description taken in conjunction with the accompanying drawings wherein like reference numerals denote like elements and in which:

FIG. 5A illustrates a first input page.

FIG. 5B illustrates a second input page.

FIG. 5C illustrates a third input page.

FIG. 5D illustrates a fourth input page.

FIG. 5E illustrates a fifth input page.

FIG. 5F illustrates a sixth input page.

FIG. 5G illustrates a seventh input page.

FIGS. 5H-5J illustrate a plurality of output pages of green e-mail correspondence that result from the green printing configuration.

FIG. 5H illustrates a first output page.

FIG. 5G illustrates a second output page.

FIG. 5I illustrates a third output page.

DETAILED DESCRIPTION

Figure 1:
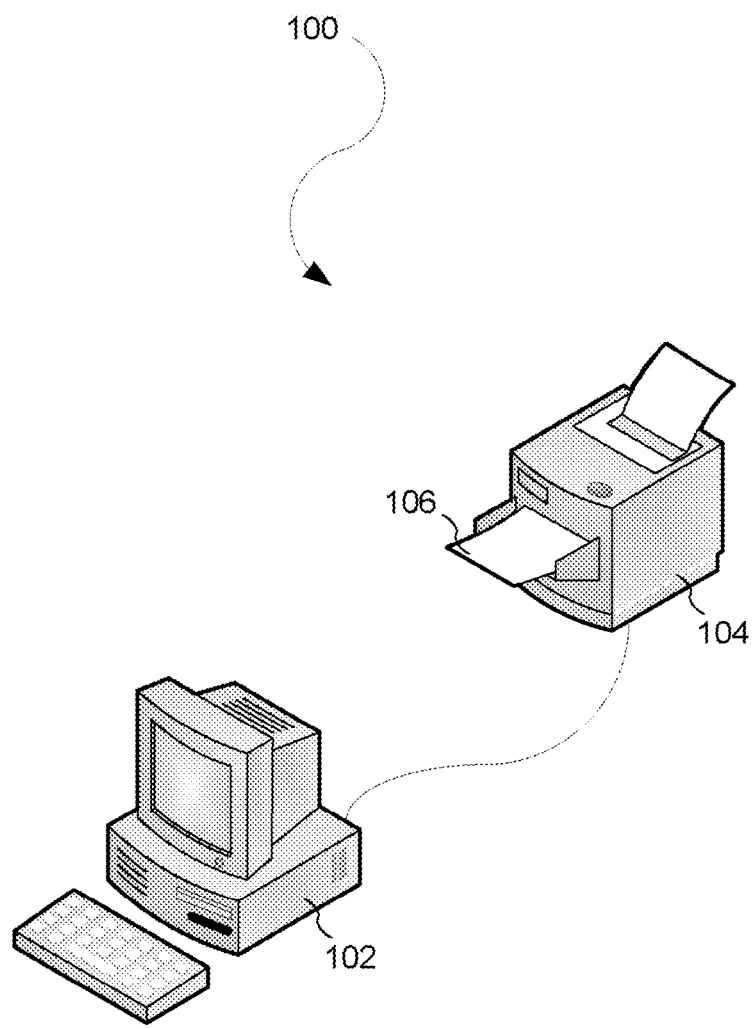
FIG. 1 illustrates a green printing configuration.

A green printing configuration is provided herein that repurposes e-mail correspondence to save paper and/or ink. The green printing configuration is a configuration that reduces the number of pages and/or ink utilizing to print e-mail correspondence through content repurposing, which is an approach that transforms content formatting to shrink the size of the content to fit into fewer pages at the same time as retaining the readability and aesthetics of the e-mail correspondence. The green printing configuration may be a method, system, computing device, computer program stored on a computing device, computer program stored on a printer, computer module that may be downloaded through a network, plug-in, extension, etc. In one embodiment, a user may print in a single click to a default printer so that the content takes up fewer pages and/or less ink than a typical printed e-mail correspondence.

E-mail correspondence may have content elements such as text, images, graphics, tables, etc. Further, e-mail correspondence may have non-content elements such as layout constraints, text formatting, fonts, and spacing elements. Examples of layout constraints include page dimension, margins, gutters, and orientation. Each element contributes to the overall appearance of e-mail correspondence. With respect to printing, the content in e-mail correspondence cannot be significantly changed as the user will likely want to print the content in the e-mail correspondence. Accordingly, the green printing configuration maintains the content as a constant during the green printing of e-mail correspondence.

The non-content elements primarily contribute to the visual appearance of the e-mail correspondence. For example, the non-content elements may function as separators for blocks of content, signifiers of importance, signifiers of relevance, and/or markers of relatedness. These non-content elements are the e-mail correspondence formatting of the e-mail correspondence. The e-mail correspondence formatting contributes to certain redundancies in the e-mail correspondence by making the e-mail correspondence occupy more space. The green printing of e-mail correspondence utilizes these redundancies in a manner that provides a quantifiable trade off between the number of pages and/or the amount of ink utilized by the content and the overall appearance of the e-mail correspondence.

E-mail correspondence may have three types of redundancies. First, the e-mail correspondence may have a redundancy that affects that number of pages occupied by the content. Second the e-mail correspondence may have a redundancy that affects the amount of ink utilized to print the e-mail correspondence. Finally, the e-mail correspondence may have a redundancy that affects both the paper and the ink.

E-mail correspondence may include text, rich text format ("RTF"), hyper text markup language ("HTML"), or the like. The green printing configuration 100 identifies structures such as one or more headers, one or more conversation blocks, and/or one or more signatures. The header includes the sender, recipient, sending date, sending, time, etc.

E-mail correspondence have specific redundancies that are specific to e-mail correspondence and are different than other types of documents such as word processing documents, presentation documents, spreadsheets, etc. The green printing configuration 100 optimizes usage of paper and ink in printing large e-mail conversations. A large e-mail conversation may over time have split into multiple threads. As an example, some recipients may join in an e-mail conversation a later point than other recipients. As another example, responses may be sent to different branches of the e-mail conversation. The green printing configuration 100 reduces the redundancy of printing all of the multiple threads that arise from the same e-mail conversation. Accordingly, the green printing configuration 100 avoids printing identical blocks of e-mail multiple times.

Content repurposing may minimize or eliminate redundant white space in e-mail correspondence. Further, content repurposing may reduce the size of large text in e-mail correspondence. In other words, content repurposing automatically adjusts the format of the content according to the adjustments that a user would most likely want to see in order to reduce the number of pages in the e-mail correspondence so that the user can still comfortably read the e-mail correspondence.

The transformations utilized for content repurposing have the goal of reducing the overall redundancy in e-mail correspondence. Although a group of transformations together may reduce the redundancy, one or more of the transformations may individually increase the redundancy. The redundancy for an individual transformation may be increased to accentuate certain characteristics of the e-mail correspondence to add to the aesthetic appeal and/or readability of the e-mail correspondence. For example, if and when e-mail correspondence is printed with multiple pages per paper sheet, a green print program may automatically decide to increase the size of the text to make the text more readable.

A transformation may have a magnitude associated therewith. In one embodiment, the magnitude may be binary. The binary magnitude may indicate whether a transformation is applied is or not applied, e.g., "0" equals transformation is not to be applied and "1" equals transformation is to be applied. In another embodiment, the magnitude may have a set of predefined discrete values. In another embodiment, the magnitude may take continuous values.

Each instance of a transformation type may have a transformation cost associated therewith for a particular e-mail correspondence type. In other words, a particular sizing transformation may have a different transformation cost for e-mail correspondence than for e-mail correspondence.

Further, each transformation may have an associated saved paper quantity. For example, a particular textual transformation may save one tenth of a sheet of paper. In addition, each transformation may have an associated saved ink quantity. For example, a particular textual transformation may save one half an ounce of ink. The transformation may potentially have both a saved paper quantity and a saved ink quantity if both paper and ink would be saved as a result of the transformation.

FIG. 1 illustrates a green printing configuration 100. As an example, a computing device 102 is illustrated as a PC. Further, as an example, the computing device 102 is operably connected to a printer 104 through a wireline connection. The term computing device 102 is herein intended to include a personal computer ("PC"), desktop computer, laptop, notebook, cell phone, smart phone, personal digital assistant ("PDA"), kiosk, etc. Further, the computing device 102 may be a client, server, network device, etc. The printer 104 may be a printing device that is separately connected, e.g., through a wireline or wireless connection, to the computing device 102, built into the computing device 102, etc. A wireless connection may receive and/or send data through a Radio Frequency ("RF") transmission, an Infrared ("IR") transmission, or the like. The printer may or may not be part of a network. Further, the printer 104 may utilize any type of printing methodology to print on paper 106, e.g. laser printing, ink jet printing, or the like.

A green print module may be utilized with the green printing configuration 100. The green print module may be stored in the computing device 102 or the printer 104. The green print module may analyze the content of e-mail correspondence to repurpose the content to save paper and/or ink.

Figure 2:
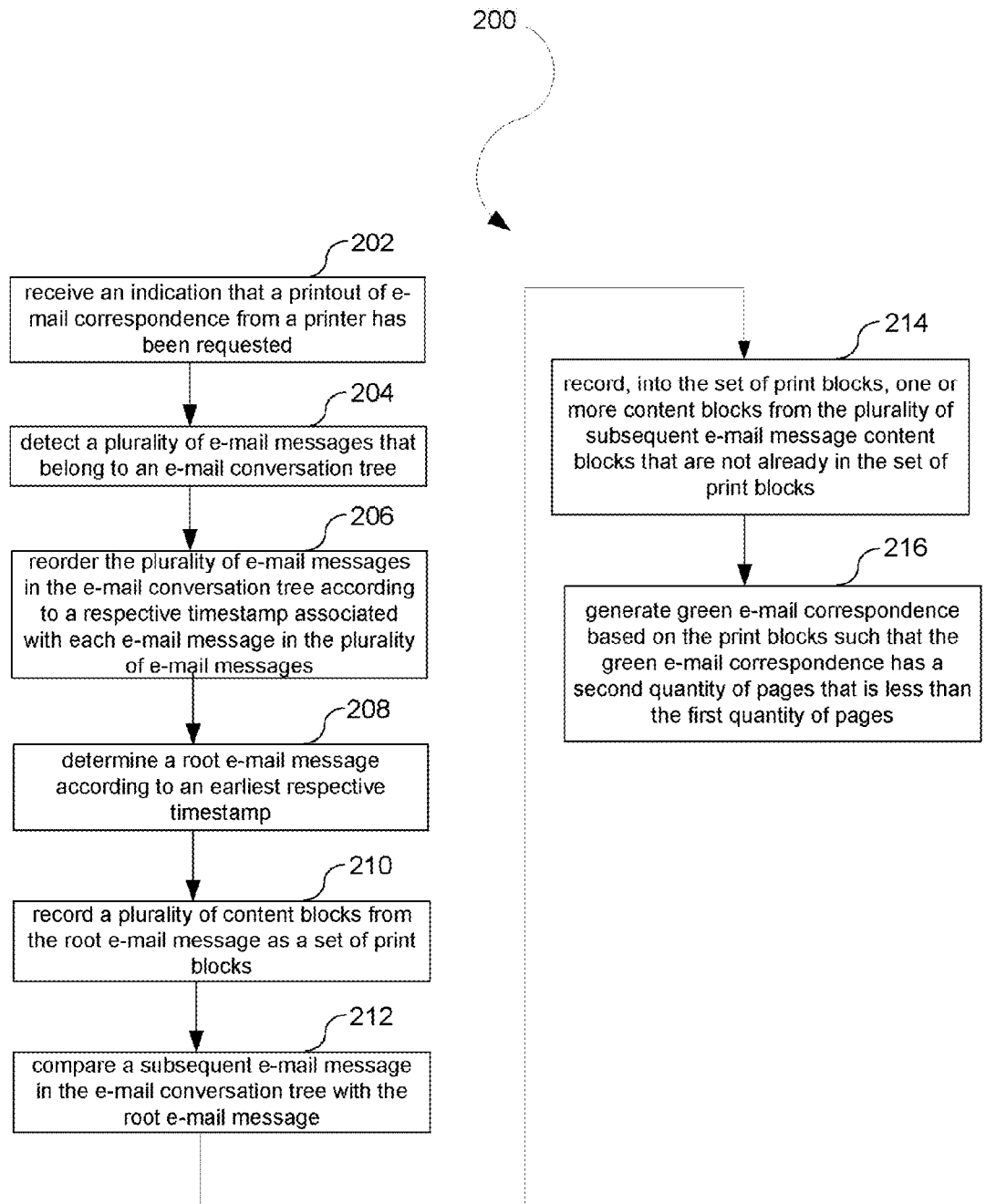
FIG. 2 illustrates a process that is utilized by the green print module to analyze e-mail correspondence for the purpose of selecting one or more transformations to the e-mail correspondence for green printing.

FIG. 2 illustrates a process 200 that is utilized by the green print module to analyze e-mail correspondence for the purpose of selecting one or more transformations to the e-mail correspondence for green printing. At a process block 202, the process 200 receives an indication that a printout of e-mail correspondence from a printer has been requested. The e-mail correspondence has content with a format that would result in a first quantity of pages being printed. Further, at a process block 204, the process 200 detects a plurality of e-mail messages that belong to an e-mail conversation tree. In addition, at a process block 206, the process 200 reorders, with the processor, the plurality of e-mail messages in the e-mail conversation tree according to a respective timestamp associated with each e-mail message in the plurality of e-mail messages. The respective timestamp indicates a time of transmission. At a process block 208, the process 200 determines, with the processor, a root e-mail message according to an earliest respective timestamp. The root e-mail message is a root node of the e-mail conversation tree. Further, at a process block 210, the process 200 records a plurality of content blocks from the root e-mail message as a set of print blocks. In addition, at a process block 212, the process 200 compares a subsequent e-mail message in the e-mail conversation tree with the root e-mail message. Further, at a process block 214, the process 200 records, into the set of print blocks, one or more content blocks from the plurality of subsequent e-mail message content blocks that are not already in the set of print blocks. In one embodiment, the content blocks from the plurality of subsequent e-mail message content blocks that are already in the set of print blocks are omitted. In another embodiment, a reference is placed instead of the duplicate content blocks. The reference indicates the page on which the content block is printed. In another embodiment, a reference is not utilized. In other words, the duplicate content block is omitted. In addition, at a process block 216, the process 200 generates, with the processor, green e-mail correspondence based on the print blocks such that the green e-mail correspondence has a second quantity of pages that is less than the first quantity of pages.

A variety of green print features may be utilized to reduce the first quantity of pages to the second quantity of pages. In one embodiment, at least apportion of the second quantity of pages has a reduced font size. In another embodiment, at least a portion of the second quantity of pages has reduced line spacing. In yet another embodiment, a header is removed from the first quantity of pages to generate the second quantity of pages. In another embodiment, a signature is removed from the first quantity of pages to generate the second quantity of pages.

Figure 3:
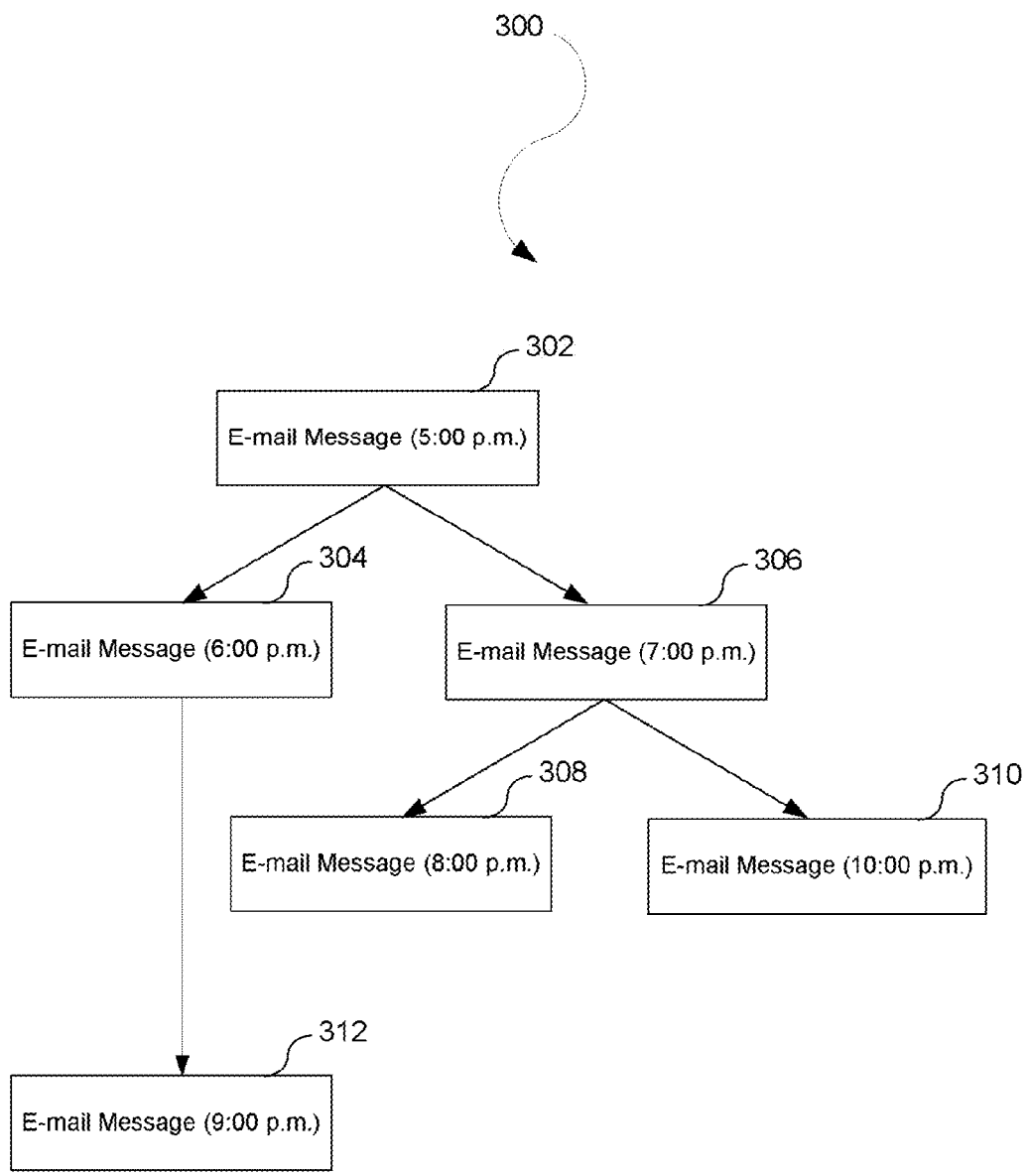
FIG. 3 illustrates an e-mail conversation tree.

FIG. 3 illustrates an e-mail conversation tree 300. A plurality of e-mail messages with respective timestamps belong to the e-mail conversation tree 300. As an example, the root e-mail message may be an e-mail message with a timestamp of five p.m. 302. Further, two threads branched off from the root e-mail message, i.e., an e-mail message with a timestamp of six p.m. 304 and an e-mail message with a timestamp of seven p.m. 306. The thread from the branch of the e-mail message with the timestamp of six p.m. 304 has an e-mail message with a timestamp of nine p.m. 312. Further, the thread from the branch of the e-mail message with the timestamp of seven p.m. 306 branched off into two separate threads, i.e., an e-mail message with a timestamp of eight p.m. 308 and an e-mail message with a timestamp of ten p.m. 310. The timestamps and structure of the e-mail conversation tree 300 are utilized merely as examples.

Figure 4:
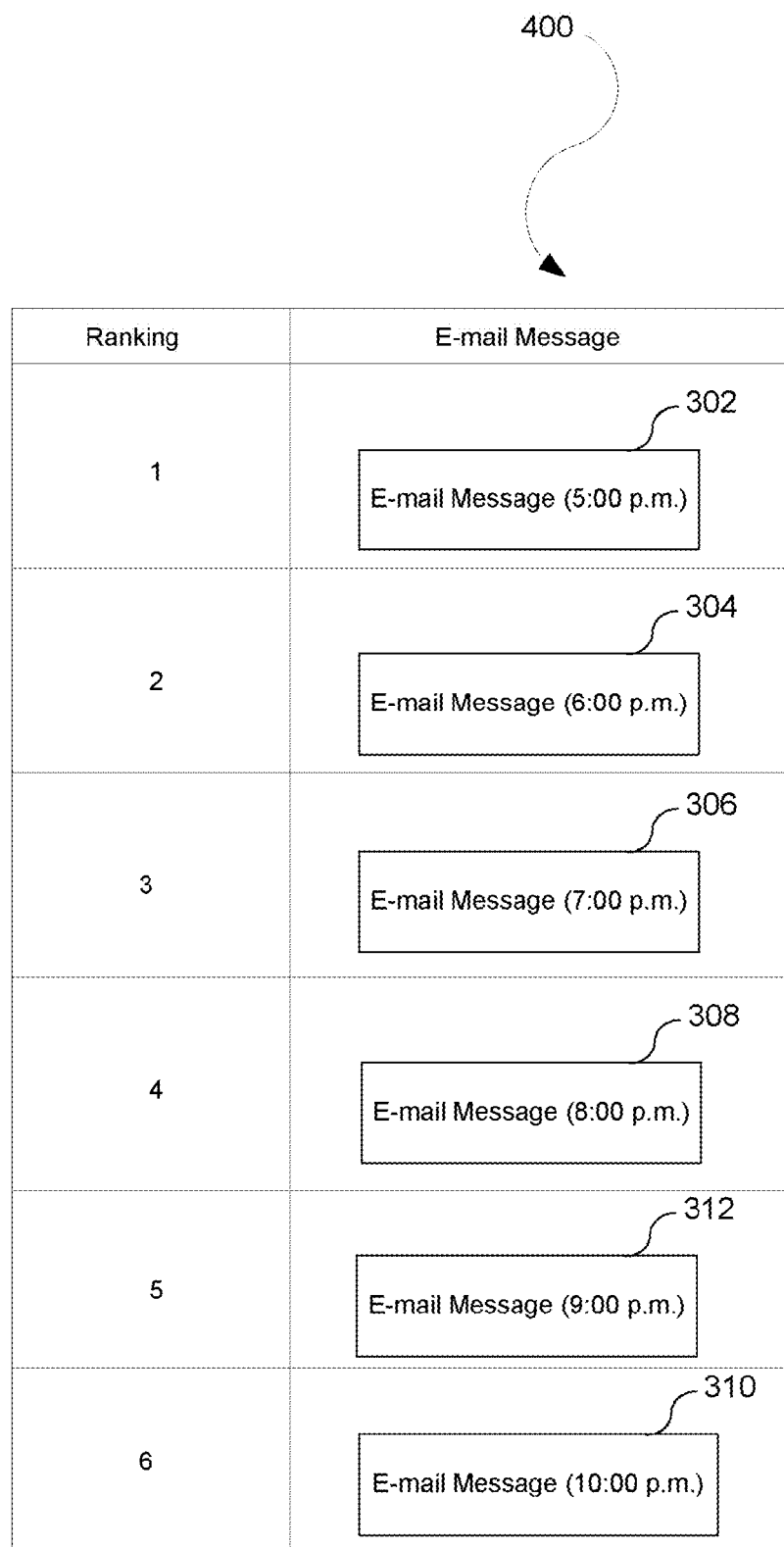
FIG. 4 illustrates a reordered list of the plurality of e-mail messages in the e-mail conversation tree illustrated in FIG. 3.

FIG. 4 illustrates a reordered list 400 of the plurality of e-mail messages in the e-mail conversation tree 300 illustrated in FIG. 3. In one embodiment, the reordered list 400 is ordered from earliest to latest timestamp. Accordingly, with the illustrated example of FIG. 3, the plurality of e-mail messages is ordered as follows: the e-mail message with the timestamp of five p.m. 302, the e-mail message with the timestamp of six p.m. 304, the e-mail message with the timestamp of seven p.m. 306, the e-mail message with the timestamp of eight p.m. 308, the e-mail message with the timestamp of nine p.m. 312, and the e-mail message with the timestamp of ten p.m. 310. Accordingly, the content blocks in the e-mail message with the timestamp of five p.m. 302 are recorded as a set of print blocks as this e-mail message is the root e-mail message. Further, the content blocks in the e-mail message with the timestamp of six p.m. 304 may be compared with the content blocks in the e-mail message with the timestamp of five p.m. 302. Any content blocks in the e-mail message with the timestamp of six p.m. 304 that have already been recorded as print blocks may be omitted. Remaining content blocks from the e-mail message with the timestamp of six p.m. 304 will be added to the set of print blocks. In addition, content blocks the e-mail message with the timestamp of seven p.m. 306 may be compared with the current set of print blocks. Any content blocks in the e-mail message with the timestamp of seven p.m. 306 that have already been recorded as print blocks may be omitted. Remaining content blocks from the e-mail message with the timestamp of seven p.m. 306 will be added to the set of print blocks. Content blocks from the e-mail message with the timestamp of eight p.m. 308 may be compared with the current set of print blocks. Any content blocks in the e-mail message with the timestamp of eight p.m. 308 that have already been recorded as print blocks may be omitted. Remaining content blocks from the e-mail message with the timestamp of eight p.m. 308 will be added to the set of print blocks. Further, content blocks from the e-mail message with the timestamp of nine p.m. 312 may be compared with the current set of print blocks. Any content blocks in the e-mail message with the timestamp of nine p.m. 312 that have already been recorded as print blocks may be omitted. Remaining content blocks from the e-mail message with the timestamp of nine p.m. 312 will be added to the set of print blocks. In addition, content blocks from the e-mail message with the timestamp of ten p.m. 310 may be compared with the current set of print blocks. Any content blocks in the e-mail message with the timestamp of ten p.m. 310 that have already been recorded as print blocks may be omitted. Remaining content blocks from the e-mail message with the timestamp of ten p.m. 310 will be added to the set of print blocks. With any of these omissions, a reference to a particular e-mail with the content block may be placed. For example, the reordered e-mails may be numbered to have reference numbers. If a content block appears in a first e-mail and a duplicate content block is omitted in a third e-mail, a reference to the first e-mail may appear in the third e-mail in the position where the omitted content would have been located. Alternatively, a reference to a page number may be utilized instead of a reference to a numbered e-mail.

In one embodiment, if more than one e-mail message in the e-mail conversation tree 300 has the same timestamp, then the relative priority is deiced based upon node depth in the tree of the e-mail messages with the same timestamp. In one configuration, a message node with lesser depth than another message node with the same time stamp will be assigned highest priority.

In another embodiment, the header of the inserted content block also specifies to which message the replay was sent. As a result, context and readability are retained.

Figure 5A:
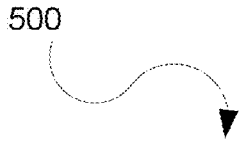
FIGS. 5A-5H illustrate a plurality of input pages of e-mail correspondence.
Figure 5B:
Figure 5C:
Figure 5D:
Figure 5E:
Figure 5F:
Figure 5G:
Figure 5H:

FIGS. 5A-5H illustrate a plurality of input pages of e-mail correspondence. FIG. 5A illustrates a first input page 500, FIG. 5B illustrates a second input page 505, FIG. 5C illustrates a third input page 510, FIG. 5D illustrates a fourth input page 515, FIG. 5E illustrates a fifth input page 520, FIG. 5F illustrates a sixth input page 525, and FIG. 5G illustrates a seventh input page 530. Further, FIGS. 5H-5J illustrate a plurality of output pages of green e-mail correspondence that result from the green printing configuration 100. FIG. 5H illustrates a first output page 535, FIG. 5G illustrates a second output page 540, and FIG. 5I illustrates a third output page 545.

The illustrated output pages in FIGS. 5G-5H illustrate the e-mails being numbered so that a reference to a numbered e-mail may be utilized to indicate where duplicate omitted text may be found. However, a reference to the location of the omitted content may not be included. The ordering of the e-mails may also not be displayed. Further, other variations with a reference, e.g., page numbers, may be utilized.

By automatically reducing the number of pages from the original format that results in a first quantity of printed pages to a repurposed format that results in a second quantity of pages, the original appearance of the e-mail correspondence is lost. Accordingly, the trade-off between the appearance of the e-mail correspondence and the amount of savings achieved from green printing is quantified according to a repurposing quantifier. In one embodiment, the appearance of the e-mail correspondence is quantified in terms of aesthetic attributes and a measure of the influence of one or more transformations on the e-mail correspondence. In one embodiment, a readability threshold may be established to specify the degree to which the appearance of the e-mail correspondence may be degraded for the purpose of green printing. Further, the e-mail correspondence may be automatically repurposed without the distortion falling below the readability threshold. The readability threshold may be based one or more readability rules. Instead of basing the readability threshold on a subject measure of appearance, the readability threshold is based on specific measurements from the e-mail correspondence. Those specific measurements are utilized to determine the risks associated with transforming certain portions of the e-mail correspondence in view of the readability rules.

Figure 6:
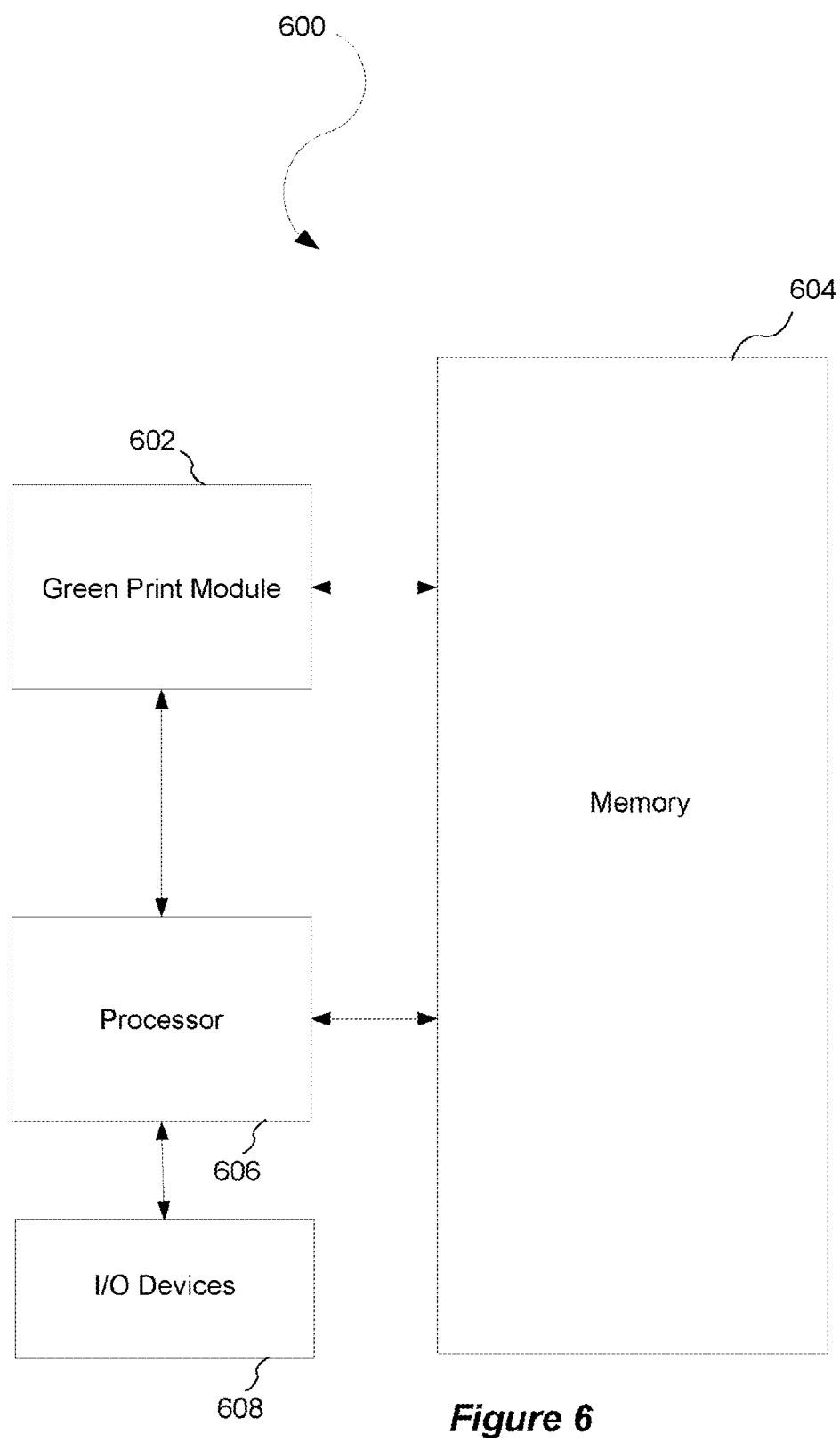
FIG. 6 illustrates a system configuration that may be utilized for green printing.

FIG. 6 illustrates a system configuration 600 that may be utilized for green printing. In one embodiment, a green print module 602 interacts with a memory 604. The green print module 602 provides the repurposed e-mail correspondence to a processor 606. Further, the processor 606 applies the transformations in the potential repurposed e-mail correspondence to the e-mail correspondence so that the user may print the final repurposed e-mail correspondence. The processor 606 interacts with input/output ("I/O") devices 608. For example, the processor 606 receives an input from a user through a keyboard to print the e-mail correspondence. The processor 606 may then print the repurposed e-mail correspondence on a printer.

In one embodiment, the system configuration 600 is suitable for storing and/or executing program code and is implemented using a general purpose computer or any other hardware equivalents. The processor 606 is coupled, either directly or indirectly, to the memory 604 through a system bus. The memory 604 can include local memory employed during actual execution of the program code, bulk storage, and/or cache memories which provide temporary storage of at least some program code in order to reduce the number of times code must be retrieved from bulk storage during execution.

The I/O devices 608 can be coupled directly to the system 600 or through intervening input/output controllers. Further, the I/O devices 608 can include a keyboard, a keypad, a mouse, a microphone for capturing speech commands, a pointing device, and other user input devices that will be recognized by one of ordinary skill in the art. Further, the I/O devices 608 can include output devices such as a printer, display screen, or the like. Further, the I/O devices 608 can include a receiver, transmitter, speaker, display, image capture sensor, biometric sensor, etc. In addition, the I/O devices 608 can include storage devices such as a tape drive, floppy drive, hard disk drive, compact disk ("CD") drive, etc.

Network adapters may also be coupled to the system configuration 600 to enable the system configuration 600 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the processes and systems described herein can take the form of entirely hardware embodiments, entirely software embodiments, or embodiments containing both hardware and software elements. If software is utilized to implement the method or system, the software can include but is not limited to firmware, resident software, microcode, etc.

It is understood that the processes and systems described herein may also be applied in other types of processes and systems. Those skilled in the art will appreciate that the various adaptations and modifications of the embodiments of the processes and systems described herein may be configured without departing from the scope and spirit of the present processes and systems. Therefore, it is to be understood that, within the scope of the appended claims, the present processes and systems may be practiced other than as specifically described herein.

We claim:

1. A computer-readable storage device having instructions stored thereon that, responsive to execution on a computer, causes the computer to perform a method comprising:
receiving an indication of a request to print an e-mail correspondence, the e-mail correspondence having content with a format that would result in a first quantity of pages being printed;
detecting e-mail messages that belong to an e-mail conversation tree of the e-mail correspondence;
reordering the e-mail messages in the e-mail conversation tree according to a respective timestamp associated with each e-mail message, the respective timestamp indicating a time of transmission, the e-mail messages reordered from an earliest respective timestamp to a latest respective timestamp, the reordering further comprising determining a relative priority of two or more e-mail messages based on a node depth of the two or more e-mail messages in the e-mail conversation tree if the two or more e-mails have equal timestamps;
determining a root e-mail message according to the earliest respective timestamp, the root e-mail message being a root node of the e-mail conversation tree;
recording content blocks from the root e-mail message as a set of print blocks;
comparing subsequent e-mail message content blocks with the set of print blocks;
recording, into the set of print blocks, one or more of the subsequent e-mail message content blocks that are not already in the set of print blocks, the recording comprising omitting any of the subsequent e-mail message content blocks that are already in the set of print blocks; and
generating a green e-mail correspondence based on the print blocks, the green e-mail correspondence having a second quantity of pages that is less than the first quantity of pages.

2. The computer-readable storage device of claim 1, wherein the computer is further caused to compare additional subsequent e-mail message content blocks with the set of print blocks, the additional subsequent e-mail message content blocks being part of an additional subsequent e-mail message having a later respective timestamp than a subsequent e-mail message having the subsequent e-mail message content blocks.

3. The computer-readable storage device of claim 2, wherein the computer is further caused to record into the set of print blocks, one or more of the additional subsequent e-mail message content blocks that are not already in the set of print blocks.

4. The computer-readable storage device of claim 1, wherein the e-mail messages are in a message folder.

5. The computer-readable storage device of claim 1, wherein the computer utilizes an indexing module to perform the detection of the e-mail messages that belong to the e-mail conversation tree.

6. The computer-readable storage device of claim 1, wherein the e-mail correspondence has a plurality of threads.

7. The computer-readable storage device of claim 1, wherein at least a portion of the second quantity of pages has a reduced font size.

8. The computer-readable storage device of claim 1, wherein at least a portion of the second quantity of pages has reduced line spacing.

9. The computer-readable storage device of claim 1, wherein the computer is further caused to remove a header from the first quantity of pages to generate the second quantity of pages.

10. The computer-readable storage device of claim 1, wherein the computer is further caused to remove a signature from the first quantity of pages to generate the second quantity of pages.

11. The computer-readable storage device of claim 1, wherein a header associated with each of the one or more content blocks indicates which one of the e-mail messages is being replied to by the content block.

12. A method comprising:
receiving an indication of a request to print an e-mail correspondence, the e-mail correspondence having content with a format that would result in a first quantity of pages being printed;
detecting e-mail messages that belong to an e-mail conversation tree of the e-mail correspondence;
reordering e-mail messages in the e-mail conversation tree according to a respective timestamp associated with each e-mail message, wherein a relative priority is determined for the reordering based on node depth in the e-mail conversation tree if timestamps are equal for two or more of the e-mail messages;
determining a root e-mail message according to an earliest respective timestamp, the root e-mail message being a root node of the e-mail conversation tree;
recording content blocks from the root e-mail message as a set of print blocks;
comparing subsequent e-mail message content blocks with the set of print blocks;
recording, into the set of print blocks, one or more of the subsequent e-mail message content blocks that are not already in the set of print blocks, the recording comprising omitting any of the subsequent e-mail message content blocks that are already in the set of print blocks; and
generating a green e-mail correspondence based on the print blocks, the green e-mail correspondence having a second quantity of pages that is less than the first quantity of pages.

13. The method of claim 12, further comprising comparing additional subsequent e-mail message content blocks with the set of print blocks, the additional subsequent e-mail message content blocks being part of an additional subsequent e-mail message having a later respective timestamp than a subsequent e-mail message having the subsequent e-mail message content blocks.

14. The method of claim 13, further comprising recording into the set of print blocks, one or more of the additional subsequent e-mail message content blocks that are not already in the set of print blocks.

15. The method of claim 12, wherein the e-mail correspondence has a plurality of threads.

16. A system comprising:
a green print module that receives an indication of a request to print an e-mail correspondence, the e-mail correspondence having content with a format that would result in a first quantity of pages being printed;
a processor configured to (i) detect e-mail messages that belong to an email conversation tree of the e-mail correspondence, (ii) reorder the e-mail messages in the e-mail conversation tree according to a respective timestamp associated with each e-mail message, the e-mail messages reordered from an earliest respective timestamp to a latest respective timestamp, wherein a relative priority is determined for the reordering based on node depth in the e-mail conversation tree if timestamps are equal for two or more of the e-mail messages (iii) determine a root e-mail message according to the earliest respective timestamp, (iv) record content blocks from the root e-mail message as a set of print blocks, (v) compare subsequent e-mail message content blocks with the set of print blocks, (vi) record, into the set of print blocks, one or more of the subsequent e-mail message content blocks that are not already in the set of print blocks and omit any of the subsequent e-mail message content blocks that are already in the set of print blocks, and (vii) generate a green email correspondence based on the print blocks, the green e-mail correspondence having a second quantity of pages that is less than the first quantity of pages, the respective timestamp indicating a time of transmission, the root e-mail message being a root node of the e-mail conversation tree.

17. The system of claim 16, wherein the processor is further configured to compare additional subsequent e-mail message content blocks with the set of print blocks, the additional subsequent e-mail message content blocks being part of an additional subsequent e-mail message having a later respective timestamp than a subsequent e-mail message having the subsequent e-mail message content blocks.

18. The system of claim 17, wherein the processor is further configured to record into the set of print blocks, one or more content blocks from the additional subsequent email message content blocks that are not already in the set of print blocks.

* * * * *